April 27, 1965

A. BRUNNER 3,180,798

VAPOR COOLED NUCLEAR REACTOR

Filed Feb. 24, 1961

Inventor:
ALFRED BRUNNER
By
K. A. May
Attorney:

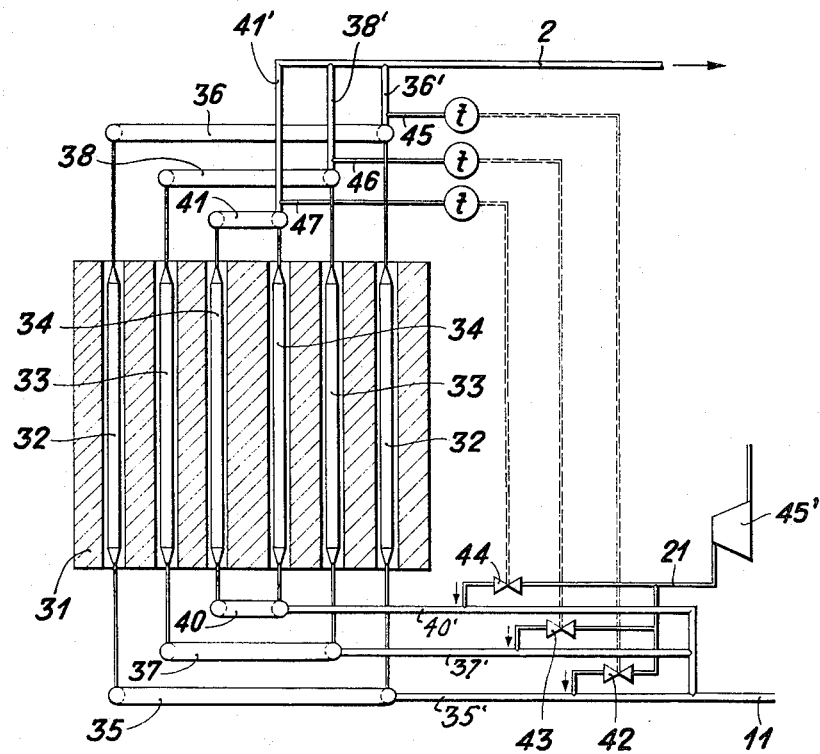

April 27, 1965 A. BRUNNER 3,180,798
VAPOR COOLED NUCLEAR REACTOR
Filed Feb. 24, 1961 3 Sheets-Sheet 3
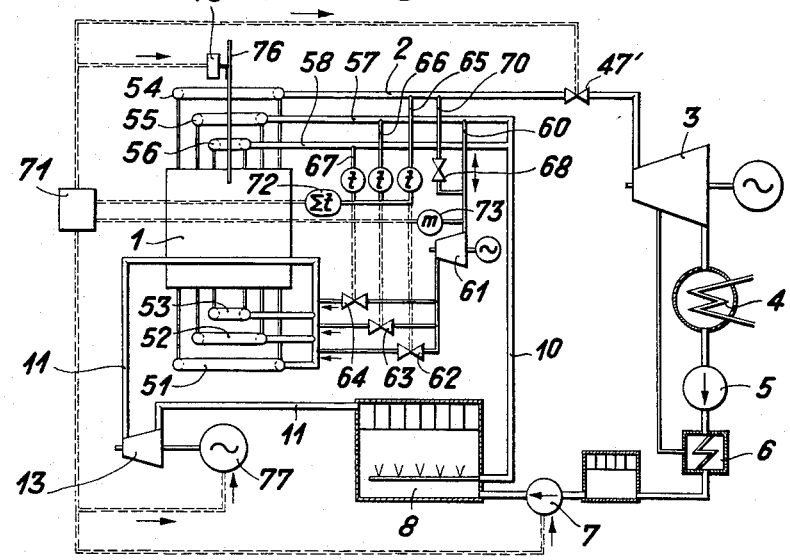
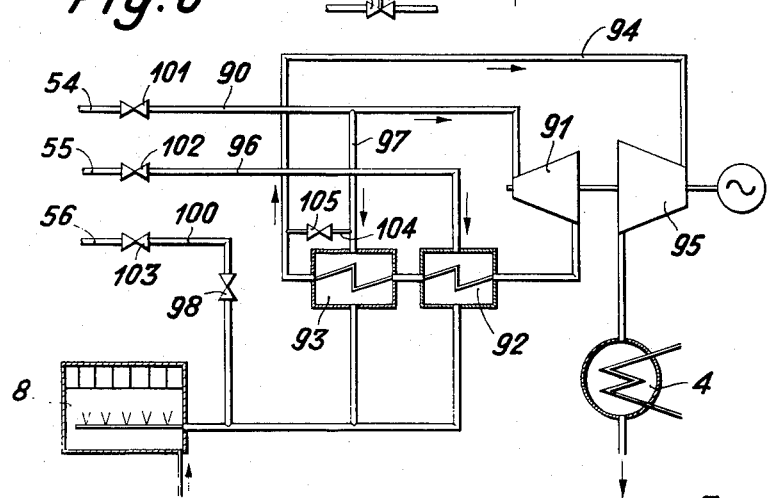
Inventor:
ALFRED BRUNNER
By K. A. Mayr
Attorney:

United States Patent Office 3,180,798
Patented Apr. 27, 1965

3,180,798
VAPOR COOLED NUCLEAR REACTOR
Alfred Brunner, Winterthur, Switzerland, assignor to Sulzer Freres, S.A., Winterthur, Switzerland, a corporation of Switzerland
Filed Feb. 24, 1961, Ser. No. 91,370
Claims priority, application Switzerland, Feb. 27, 1960, 2,181/60
6 Claims. (Cl. 176—20)

The invention relates to vapor generation by a vapor-cooled nuclear reactor whereby an operating medium is introduced as a coolant in vapor state into the reactor and is superheated therein, the vapor being produced by introducing at least some of the superheated vapor which leaves the reactor into a vessel placed outside the reactor and containing the medium in liquid state.

The advantage of using a medium, for example water, which will evaporate in the pressure range and temperature range of the reactor plant, is improved heat transfer as compared with the conventional gas cooling, a lower power circulating blower, and a much cheaper coolant. A disadvantage, however, is that the fuel rods and the cans thereof may be severely corroded and eroded if the medium enters the reactor in liquid form. In nuclear reactors the slightest risk of corrosion and erosion must be avoided, because, otherwise, active products may escape and the reactor would have to be stopped for a prolonged time.

In the art of steam generations with conventional fuels an arrangement is known as the "Löffler" system wherein a medium in liquid state is preheated and thereupon evaporated by admixture of the same medium in superheated vapor state. The resultant wet vapor is superheated in a heater heated by heat resulting from the combustion of fuel. A portion of the superheated vapor is used, for instance, for operating a turbine plant, while the other portion is used to evaporate the preheated medium. It has been proposed to use this system in combination with a nuclear reactor whereby the latter supplies the heat for the superheating step. This system, however, has been found useless because liquid medium is bound to enter the reactor. Vapor produced by direct contact of superheated vapor with medium in liquid state in a vessel contains droplets of liquid medium which are carried along by the produced wet vapor. The moisture content of the vapor is subsequently further increased by unavoidable heat losses from the conduits between the vessel and the reactor.

It is an object of the invention to provide a system for producing dry superheated vapor from a medium in liquid state by using the heat generated in a nuclear reactor whereby any contact of wet vapor or liquid medium with parts of the reactor is positively avoided. This object is obtained by using the nuclear reactor as a superheater for an operating medium entering the reactor in superheated vapor state at a relatively low superheat temperature and leaving the reactor at a relatively high superheat temperature, using part of the highly superheated vapor for evaporating the liquid operating medium by direct contact with a portion of the highly superheated vapor in a vessel outside of the reactor, drying and slightly superheating the vapor produced in the vessel by another portion of the highly superheated vapor, and introducing the dry and slightly superheated vapor as a coolant into the reactor for producing highly superheated vapor. The balance of the highly superheated vapor not used for evaporating liquid operating medium and drying and superheating the so produced wet vapor, is available for consumers of highly superheated vapor, for example a vapor-operated turbine.

In a further development of the invention the highly superheated vapor is also used as a heating agent for reheating partly expanded highly superheated vapor in an indirectly heated reheater and using the highly superheated vapor leaving the reheater and still superheated for evaporating the liquid operating medium in the vessel.

In another development of the invention a plurality of coolant circuits are arranged whereby relatively highly presuperheated vapor is used as a coolant for relatively cool fuel elements of the reactor and relatively little presuperheated vapor is used as a coolant for relatively hot fuel elements of the reactor.

An object of the invention is the provision of automatic control means in plants of the aforedescribed type for controlling the distribution of the highly superheated vapor produced in the reactor to a consumer, to the vessel for evaporating liquid operating medium, and to the wet vapor produced in the vessel for drying and presuperheating the wet vapor before it enters the reactor.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 3 is a diagrammatic illustration of a cooling system for a nuclear reactor.

FIG. 4 is a schematic illustration of a modified vapor generating and vapor power plant according to the invention wherein a cooling system according to FIG. 3 for a nuclear reactor is used which reactor supplies the heat to the vapor generating and power plant.

FIG. 5 is a schematic illustration of a modified detail of the plant according to FIG. 4.

FIG. 6 is a schematic illustration of a modification of the vapor generating and power plant shown in FIG. 4 wherein the vapor is expanded in a two-stage turbine and reheated between the stages by vapor supplied by the nuclear reactor.

Figure 1:
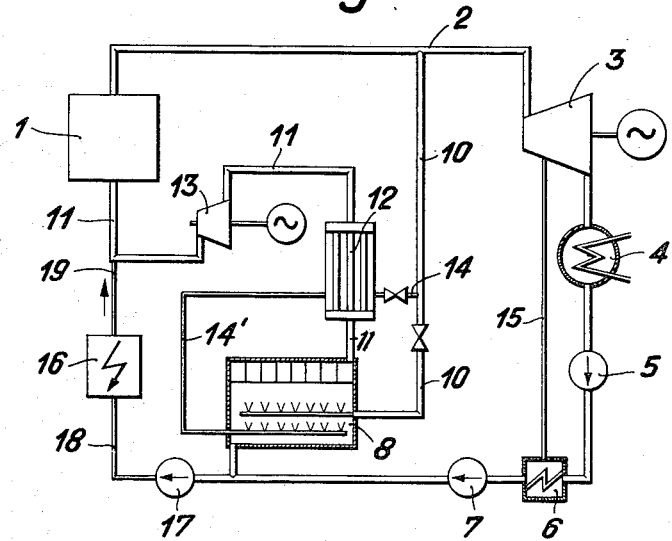
FIG. 1 is a schematic illustration of a vapor generating and vapor power plant wherein heat is supplied by a nuclear reactor.

Referring to FIG. 1, the vapor superheating part of a reactor 1 is connected to a turbine 3 by a pipe 2. The vapor leaving the turbine 3 is condensed in a condenser 4, the condensate being pumped to a preheater 6 by a condensate pump 5. The liquid medium is pumped from the preheater 6 to a vessel 8 by a feed pump 7. Branching off from the pipe 2 is a pipe 10 which extends to the vessel 8 and through which medium in vapor state which has been superheated in the reactor 1 is supplied to the vessel 8. Medium in the state of wet vapor leaves the vessel 8 through a pipe 11 to enter a heat exchanger 12, passes therefrom to a blower 13 and then enters the reactor 1. The heat exchanger 12 is supplied with superheated vapor from the pipe 10 through a pipe 14. After having given up heat in the heat exchanger 12, the vapor is conducted to the vessel 8 through a pipe 14'. Vapor bled from the turbine 3 is supplied to the preheater 6 through a pipe 15. For starting up the plant a boiler 16 is provided, for instance an electric boiler, to which liquid medium is supplied by a feed pump 17 through a pipe 18, the medium being evaporated and superheated in the boiler 16 and entering the reactor through a pipe 19.

When the plant is in normal operation, superheated vapor is supplied from the reactor 1 through the pipe 2 to the turbine 3, is expanded therein, and is liquefied in the condenser 4. The condensate passes therefrom to the vessel 8. Superheated vapor is supplied from the pipe 2 through the pipe 10 to the vessel 8 and used to evaporate liquid medium. Some of the vapor conducted by the pipe 10 passes through the heat exchanger 12, transfers some of its heat to the wet vapor supplied from the vessel 8 through the pipe 11, and then flows through the pipe 14' to the vessel 8. The vapor produced in the vessel 8 is presuperheated in the heat exchanger 12 and conveyed by the blower 13 to the reactor 1 where it is further superheated to the desired working temperature. The presuperheating of the vapor in the heat exchanger 12 increases the temperature of the vapor to a degree preventing condensation on the way to the reactor so that only medium in dry vapor state enters the reactor.

Figure 2:
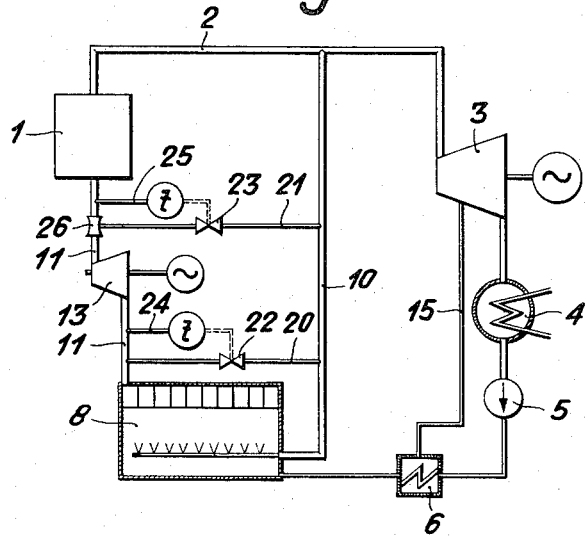
FIG. 2 is a schematic illustration of a modified vapor generating and vapor power plant according to the invention.

Another embodiment of the invention is diagrammatically illustrated in FIG. 2. In this case the wet vapor issuing from the vessel 8 is not presuperheated in a heat exchanger; instead, superheating is achieved by mixing the wet vapor with superheated vapor from the reactor. To this end, the pipe 10 is connected to the pipe 11 by pipes 20 and 21 provided with throttle elements 22 and 23, respectively. The throttle elements 22 and 23 are preferably automatically adjusted in dependence upon temperature signals initiated by temperature sensing devices 24 and 25, respectively. Apart from a throttle element, no special means are required to control the superheated vapor supply through the pipe 20, since the pressure in the pipe 10 is greater than the pressure in the pipe 11. However, since the pressure in the pipe 11 after the blower 13 is greater than the pressure in the pipe 10, the vapor from the pipe 21 is introduced by an injector 26. Of course, the supply of vapor to the pipe 11 at two places as shown in the drawing is merely exemplary and in principle vapor can be supplied at a single place either before or after the blower 13. Supply of hot vapor to the pipe 11 upstream of the blower has the advantage of making the apparatus simpler and cheaper, whereas the supply of hot vapor downstream of the blower 13 improves the thermal efficiency of the plant.

A particular form of the apparatus shown in FIG. 2 is illustrated in detail in FIG. 3. The generation of heat in the various parts of a reactor is not homogeneous and depends upon the local intensity of the neutron flux. Fuel elements disposed in a central zone of a reactor core produce more heat than elements disposed in an outer zone thereof, since the neutron flux is denser in the center of the core than at the outside. In order to obtain the same temperature of the vapor leaving the individual zones of the reactor, heating of the vapor entering the individual zones of the reactor is adjusted according to the desired temperature of the vapor leaving the individual zones.

FIG. 3 shows a moderator unit 31 in which rodlike fuel elements 32, 33 and 34 are arranged. The elements 32 are connected through a header 35 and a pipe 35' to a pipe 11 for supplying relatively cool vapor and through a header 36 and a pipe 36' to the pipe 2 conducting superheated vapor. The elements 33 are correspondingly connected to the pipes 11 and 2 by means of headers 37 and 38 and pipes 37' and 38', respectively, and the elements 34 are connected to the pipes 11 and 2 by means of headers 40 and 41 and pipes 40' and 41', respectively. Supply of superheated vapor from a pipe 21 to the pipes 35', 37' and 40' is controlled by valves 42, 43 and 44, respectively, which are controlled in dependence upon a temperature pulse initiated by temperature sensors 45, 46, 47, respectively, which sense the temperature of the pipes 36', 38' and 41', respectively. A blower 45' is interposed in the pipe 21 to overcome the difference between the pressures in the pipe 2 and the pipe 11 which receives superheated vapor from the pipe 2 as in the arrangement according to FIG. 2.

With the system illustrated in FIG. 3 vapor issuing from all zones of the reactor can be maintained, for example, at the same temperature without, for instance, throttling the flow of the vapor through the individual groups of fuel elements whereby the heat transfer would be impaired. Of course, the number of fuel elements and zones shown in FIG. 3 is merely exemplary and, as a rule, more fuel elements and, in certain cases, more zones will be provided.

Another embodiment of the invention is illustrated in FIG. 4 wherein the reactor 1 is subdivided, for instance, into three zones to which medium is supplied through headers 51, 52, 53 and from which medium is removed through headers 54, 55, 56. The header 54 containing vapor from the least heated zone of the reactor is connected directly to the pipe 2 extending to the turbine 3. The headers 55, 56 containing medium from the inner and hottest zones of the reactor are connected by pipes 57, 58 to the pipe 10 extending to the vessel 8. Some of the medium is diverted from the pipe 57 to a pipe 60, is driven by a blower 61 through throttle elements 62, 63, 64 to the headers 51, 52, 53, respectively, and mixed therein with wet vapor from the vessel 8, the wet vapor being supplied through the pipe 11. The throttle elements 62, 63, 64 are controlled by temperature sensors 65, 66, 67 connected to the pipes 2, 57, 58, respectively. The pipe 2 is connected to the pipe 60 by way of a pipe 70 wherein a throttle element 68 is interposed.

The embodiment shown in FIG. 4 provides maximum superheating of the medium since the temperature drop between the individual fuel elements and the coolant increases in proportion to the heat produced in the individual elements. However, due to the character of the fissionable material, there is a maximum permissible temperature at a particular part of the fuel element, for instance, within the element or in the covering thereof. Consequently, fuel elements which produce less heat permit heating of the coolant to a higher temperature and a higher outlet temperature of the coolant than fuel elements which generate more heat. Intensely heated fuel rods in the inner zones of the reactor permit only a relatively low coolant outlet temperature.

In the arrangement illustrated in FIG. 4, the medium coming from the outer reactor zones and having the highest temperature is supplied from the header 54 to the turbine, whereas the lower temperature medium from the inner zones of the reactor is used to evaporate the liquid medium in the vessel 8. The medium issuing from the vessel 8 is superheated by medium from the inner zones of the reactor. The last mentioned medium, which is supplied through the pipe 60 to the throttle elements 62–64, has its pressure increased by a blower 61 to overcome the pressure difference between the pipe 10 and the pipe 11.

Medium can be supplied from the pipe 2 to the pipe 60 and vice versa through the by-pass pipe 70 comprising the throttle element 68. In this way, for instance, when the plant is started up, all superheated medium is initially used for the evaporation in the vessel 8. During normal operation, it may be of advantage to supply vapor from the pipe 2 to the vapor in the pipe 60 or to conduct some of the vapor from the pipe 60 or from the pipes 57, 58 to the pipe 2. A control arrangement is shown in FIG. 4 comprising a regulator 71 which receives pulses either from the temperature sensors 65–67 by way of an integrator 72 or alternatively from a flow-rate-measuring device 73 disposed in the pipe 60. Depending upon the pulse received, the regulator 71 actuates a throttle element 47' in the pipe 2, an adjusting device 75 for a control rod 76, and/or driving motor 77 for the blower 13 or for the feed pump 7. In the system shown in FIG. 4 the hot vapor is supplied to the wet vapor pipe 11 between the blower 13 and the headers 51 to 53 in cascade-fashion. This has the advantage that, should a temperature control element fail, the temperature of the system affected departs less from the desired value than in the system shown in FIG. 3. In the arrangement shown in FIG. 4, medium at the maximum possible temperature can be supplied to the turbine 3, thus improving the thermal efficiency of the plant.

FIG. 5 illustrates a preferred form of the control system shown in FIG. 4. The heat generation of the individual fuel elements varies not only in dependence upon their arrangement in the reactor but also upon momentary load on the reactor. The permissible temperature of the coolant stream depends, inter alia, upon the coefficient of heat transfer which increases as the rate of flow increases. In the control arrangement shown in FIG. 5 which represents a part of FIG. 4, the temperature sensor 67 in the pipe 58 does not act directly upon the throttle element 64 but actuates a regulating unit 80 which actuates the throttle element 64. The regulating unit 80 is also acted upon by pulses delivered by an instrument 81 measuring neutron flux intensity and by pulses delivered by a flow-rate-measuring instrument 82 disposed in the pipe 58. The pulses are supplied to the regulating unit 80 by way of a function transmitter 83 which, in manner known per se, sends a signal to the unit 80 which signal corresponds to the magnitude and relative intensity of the pulses received by the device 83. The control arrangement shown in FIG. 5 makes it possible to maintain a maximum permissible temperature of the superheated vapor at variable load conditions.

FIG. 6 illustrates an embodiment of the invention comprising a turbine plant having stages between which the operating vapor is reheated. Hot vapor delivered from the header 54 is supplied through a pipe 90 to a high-pressure stage 91 of a turbine. The vapor leaving the stage 91 flows through heat exchangers or reheaters 92, 93 and a pipe 94 to a low-pressure stage 95 of the turbine and thence to the condenser 4. The medium issuing from the header 55 passes through a pipe 96 into the reheater 92 and thence to the vessel 8. Medium leaving the header 56 passes through a throttle member 98 directly to the vessel 8. A pipe 97 which branches off the pipe 90 supplies heating vapor to the reheater 93 and extends to the vessel 8. Throttle members 101, 102, 103 are interposed in the pipes 90, 96, 100, respectively, which provide selective distribution of the medium to the pipes 90, 96 and 100, for instance, in dependence upon flow rate or temperature of the vapor, or in dependence upon the rate of flow of heating vapor supplied through the throttle members 62–64. The throttle members 101–103 are preferably actuated by a control arrangement of the kind disclosed in my copending application Serial No. 89,032, filed February 13, 1961, now Patent No. 3,138,143. With a control arrangement of this type, for instance, the rates of flow of the medium flowing through the individual pipes can be maintained equal or in a desired relationship to one another, whereby at least one of the throttle members is fully open, to obtain minimum throttle losses. The pipes 97 and 94 are interconnected by a connecting pipe 104 comprising a throttle member 105, so that hot vapor from the pipe 90 can be mixed with the medium-pressure vapor in the pipe 94. In the embodiment shown in FIG. 6 as in the embodiment shown in FIG. 4 the highest temperature medium is used to drive the turbine, while the relatively low temperature medium is used to superheat the vapor or to evaporate the liquid medium. Heating of the heat exchanger 93 by superheated vapor from the pipe 90 affords maximum superheating of the low-pressure vapor for the turbine 95.

Of course, in all the illustrated examples indirect heat exchangers can be replaced by direct heat exchangers or mixers and vice versa without changing the fundamental ideas underlying the invention and diagrammatically shown in FIGS. 1 and 2.

I claim:

1. In combination with a vapor-cooled nuclear reactor having a plurality of zones of different heat intensity:

coolant discharge means including a plurality of discharge conduits individually connected to different heat intensity zones of the reactor for discharging heated coolant in the form of superheated vapor from the reactor, a superheated vapor consumer connected to said discharge means for receiving superheated vapor therefrom, a vessel containing coolant in liquid state, a pipe connecting said coolant discharge means and the liquid space in said vessel for conducting superheated vapor into said vessel and evaporating the liquid coolant therein, a coolant supply conduit connected to the vapor space in said vessel and including a plurality of pipes arranged in parallel relation with respect to flow of the coolant and individually connected to different heat intensity zones of the reactor for supplying vapor from said vessel as a coolant to the reactor, means interposed in said supply conduit between said vessel and the reactor for effecting flow of vapor from said vessel to the reactor, a plurality of pipe lines connected to said discharge means for receiving superheated vapor therefrom and individually connected to said pipes of said coolant supply conduits for discharging superheated vapor into said pipes for heating and drying the vapor flowing therein, a valve in each of said pipe lines, and a temperature responsive control signal producing device connected to each of said discharge conduits, said control signal producing devices being individually operatively connected to said valves for opening said valves upon a decrease of the temperature of the respective discharge conduit below a predetermined temperature, and vice versa.

2. In the combination according to claim 1, a rate of superheated vapor flow measuring device connected to each of said discharge conduits and producing control signals corresponding to the measured flow rates, a neutron flux measuring device operatively connected to each heat intensity zone of the reactor for producing control signals corresponding to the measured neutron fluxes, and means for combining the signals produced by the devices connected to the same discharge conduit and respective heat intensity zone, said signal combining means being individually connected to said valves for actuating said valves in accordance with the combined signals produced in said signal combining means.

3. The combination according to claim 1 wherein the temperature set point of the temperature responsive control signal producing device connected to the discharge conduit connected to a high heat intensity zone is lower than the temperature set point of the temperature responsive control signal producing device connected to the discharge conduit connected to a low heat intensity zone.

4. In combination with a vapor-cooled nuclear reactor having a plurality of zone of different heat intensity:

coolant supply conduits, one each of said supply conduits being connected to each of said zones for individually supplying a cool vapor as a coolant to said zones, coolant discharge conduits, one each of said discharge conduits being connected to each of said zones for individually receiving the heated coolant in the form of superheated vapor from said zones, a vessel containing coolant in liquid state, a pipe interconnecting the coolant discharge conduit connected to a high heat intensity zone and the liquid space in said vessel for introducing superheated vapor into the liquid space of said vessel for evaporating the liquid coolant therein, a pipe connecting the vapor space of said vessel to said coolant supply conduits, means interposed in said last mentioned pipe for effecting flow of vapor from said vessel to said coolant supply conduits, a heat exchange means interposed in said last mentioned pipe and connected to the coolant discharge conduit connected to a high heat intensity zone for receiving superheated vapor for heating and drying the vapor issuing from said vessel, and a vapor consumer connected to the coolant discharge conduit connected to a low heat intensity zone for receiving superheated vapor therefrom.

5. In combination with a vapor-cooled nuclear reactor having a plurality of zones of different heat intensity:

a coolant supply conduit connected to the reactor for supplying vapor as a coolant to the reactor, coolant discharge conduits, one each of said discharge conduits being connected to each of said zones for individually receiving the heated coolant in the form of superheated vapor from said zones, a vessel containing coolant in liquid state, a pipe connecting the liquid space in said vessel to at least one of said discharge conduits for introducing superheated vapor into said vessel for evaporating the liquid coolant therein, said coolant supply conduit being connected to the vapor space of said vessel for receiving vapor therefrom, means interposed in said coolant supply conduit for effecting flow of vapor from said vessel to the reactor, a heat exchange means interposed in said supply conduit and connected to at least one of said coolant discharged conduits for receiving superheated vapor therefrom for heating and drying the vapor issuing from said vessel, and a vapor power plant having at least two pressure stages and a vapor reheater interposed therebetween, said power plant being connected to the coolant discharge conduit connected to a low heat intensity zone for receiving superheated vapor as operating medium therefrom, said reheater being connected to the coolant discharge conduit connected to a high heat intensity zone for receiving superheated vapor as heating agent therefrom.

6. The combination defined in claim 5 wherein said reheater has at least two stages arranged in series relation with respect to the flow of the vapor to be reheated, the first of said reheater stages with respect to the flow of the vapor to be reheated being connected to the coolant discharge conduit connected to a high seat intensity zone of the reactor for receiving superheated vapor as a heating agent therefrom, and the second of said reheater stages being connected to the coolant discharge conduit connected to a low heat intensity zone for receiving superheated vapor as a heat agent therefrom.

References Cited by the Examiner

UNITED STATES PATENTS

| 2,952,602 | 9/60 | Wootton | 176—60 |
| 2,975,118 | 3/61 | Tognoni | 176—59 |
| 3,047,479 | 7/62 | Young et al. | 176—53 |
| 3,069,342 | 12/62 | Flatt | 60—70 |

FOREIGN PATENTS

| 1,006,084 | 4/57 | Germany. |
| 792,171 | 3/58 | Great Britain. |
| 797,725 | 7/58 | Great Britain. |
| 1,040,713 | 10/58 | Germany. |
| 841,920 | 7/60 | Great Britain. |

OTHER REFERENCES

Wooton et al.: Proceedings of 2nd Geneva Conference, 1958, vol. 7, page 827.

CARL D. QUARFORTH, *Primary Examiner.*

REUBEN EPSTEIN, *Examiner.*